3,440,168
PROCESS AND COMPOSITIONS FOR SUPPORTING MATERIALS IN THE PRESENCE OF WATER
Jack M. Kincaid, Houston, Tex., assignor to Petro-Tex Chemical Corporation, Houston, Tex., a corporation of Delaware
No Drawing. Filed Oct. 23, 1967, Ser. No. 677,087
Int. Cl. C10m 7/02
U.S. Cl. 252—12.6                9 Claims

ABSTRACT OF THE DISCLOSURE

Method for supporting at least one moving surface in the presence of water by use of polybutene-1 compositions. Novel polybutene-1 compositions containing inert, slightly soluble, slightly hygroscopic materials are disclosed.

Background of the invention

The peresent invention relates to the use of polybutene-1 compositions containing a variety of substances for supporting a moving surface or surfaces in the presence of water. More particularly, the invention relates to the novel use of polybutene-1 compositions containing materials such as carbon black, attapulgite, and nylon fibers, as water-lubricated bearing materials.

A sizable amount of research has been directed recently toward the production of a low cost, water-lubricated support or bearing material suitable for use in low pressure, low velocity applications. For example, external equipment for submarines and submersible water pumps are obvious illustrations where a water-lubricated bearing material would have utility. While previously polyethylene compositions have been given consideration for these applications, indications of superior durability and resistance to cold flow by intermediate or high density polybutene-1 have stimulated interest in its potential use for these purposes.

Summary of the invention

According to the present invention, it has been found that polybutene-1 compositions containing from about 0.1 percent to about 35 percent by weight, based on the weight of polubutent-1, of an inert, non-lubricating matemial which has a tendency to take up small amounts of water even though possessing slight solubility therein, perform exceptionally well as water-lubricated bearing materials. In practice, of course, it is necessary that the material does not substantially adversely affect the properties of the polymer. While it is not intended to limit the invention by any theory, it is believed that incorporation of a slightly hygroscopic material of the type described, e.g., carbon black, in the polybutene-1 polymer gives the normally hydrophobic polymer exceptional capability for water lubrication.

Description of the invention

In general, the polymers employed in the method and compositions of the invention are primarily isotactic polymers of polybutene-1 having intermediate to high density and generally having a molecular weight of from about 450,000 to 750,000 on a weight average basis, contain more than 50 percent ether insolubles, have a density within the range of about 0.88 to about 0.92 (grams/cc. at 25° C.) (ASTM D 1238–57T), a melt index of from about 0.1 to about 5 (ASTM D 1238–57T), a yield strength of about 1800 to about 3200 p.s.i. (ASTM D 638–58T modified), and a tensile strength of between 3000 p.s.i. to about 6000 p.s.i. (ASTM D 638–58T). The melt index of such polymer at 190° F. is generally between 0.2 to 2.0 (ATSM D 1238–57T) with a Shore D hardness of between about 60 and 73 (ASTM D 1706–59T) and an elongation percent of between 200 and 400 percent (ASTM D 638–58T modified).

The preparation of the polymer per se forms no part of the present invention and complete descriptions of processes for preparation of the polymer may be found in U.S. Patent 3,184,442 to Nagel, issued May 18, 1965, and U.S. Patent 3,190,866 to Nagel et al., issued June 22, 1965. The compositions utilized in the invention, however, may be prepared by physical incorporation of the slightly hygroscopic material into the polymers of the type described, for example, by mixing the polymer and sufficient hygroscopic materials to make a 30 percent to 40 percent mixture by weight of the material in a large mixer, such as a Banbury mixer, and then "letting down" the concentration of the hygroscopic component by addition of polymer to arrive at the levels contemplated by the invention.

As noted, any inert, easily reducible, non-lubricating material which has slight water solubility, which does not substantially adversely affect the properties of the polymer, and which is slightly hygroscopic, may be utilized. Mixtures of the slightly hygroscopic materials may be employed. Carbon black is an exceptional material for this purpose. The rubber and plastic grades of channel blacks and furnace blacks have been found to be most useful in this invention, particularly the furnace blacks. Preferably the carbon blacks employed have average particle sizes of about 150 to 800 angstroms in diameter, and the furnace combustion blacks having a particle size averaging from about 200 to about 800 angstroms have been found to be particularly useful in the invention. The particle size of attapulgite, when used, is preferably in the range of 0.1 micron to 18.0 microns, while nylon fiber is preferably of about 3 denier, cut to $\frac{1}{16}''$ to $\frac{1}{8}''$ in size. A more detailed description of the preparation of a bearing material of the present invention is as follows:

Example

About four hundred and fifty grams of a primarily isotactic, intermediate density polybutene-1 having a molecular weight of from about 450,000 to 750,000 on a weight average basis was fed into a two roll rubber mill using a roll temperature sufficient to melt the polymer, i.e., approximately 325° F. After the polymer was melted, sufficient carbon black having an average particle size of 200 to 800 angstroms in diameter to make the final product approximately 1 percent by weight carbon black, i.e., about 5 grams, was added to the molten polymer. The mixture was milled for approximately fifteen minutes, allowed to cool on the rubber mill, and was then allowed to cool further for about ten to fifteen minutes after removal from the rubber mill. The solidified product was then ground to reduce the size of the compound to small chunks about $\frac{1}{8}''$ to $\frac{1}{6}''$ in size. The material was then fed into a small extruder where the barrel heat was maintained at a temperature sufficient to maintain the material as a melt. The product was then extruded into a semi-positive flashing mold and was placed in a preheated press at 325° F. for approximately thirty minutes under minimum pressure. The heat was then turned off and the mass was cooled. During this stage, moderate pressure was applied until the plastic mass was sufficiently cooled to permit increasing the pressure to approximately 25 tons of ram force without causing appreciable plastic flow out of the mold. The cylindrical disc product was then cooled to 120° F. under the above pressure. After aging for ten days, the composition was found to have superior properties in supporting a moving object or surface, showing little wear and good water lubricating effects.

The amounts of the slightly hygroscopic material used in the compositions of the invention may be varied within a wide range of proportions, the chief requirement being that enough of the material be present to impart sufficient hygroscopicity to achieve good wetting. In general, amounts of the hygroscopic substance ranging from about 0.1 percent to 35 percent by weight carbon black based on the weight of polybutene-1 present are suitable with a carbon black content of from about 0.5 percent to about 25 percent by weight being preferred. Amounts ranging from 0.5 percent by weight to 24 percent by weight carbon black give excellent results. Similarly, amounts of from about 0.1 percent to about 35 percent by weight of attapulgite, and nylon are preferred, with amounts of from about 1 percent to about 25 percent by weight being most preferred for these materials.

If desired, other materials such as fillers and reinforcing agents may be incorporated into the novel compositions of the invention, the primary requirement being that the added material does not affect the hygroscopicity of the composition. For example, such reinforcing agents as glass and asbestos may be employed. Additionally, other polymers such as polyethylene and polypropylene may be blended in minor proportions, i.e., less than fifty percent of the total composition. The compositions disclosed herein are admirably suited for use in a variety of bearing types such as journal, thrust, and slide bearings.

While there are above disclosed but a limited number of embodiments of the method and compositions of the invention herein presented, it is possible to produce still other embodiments without departing from the inventive concept herein disclosed, and it is desired therefore that only such limitations be imposed on the appended claims as are stated therein, or required by the prior art.

I claim:

1. A method of supporting at least one moving surface in the presence of water comprising providing a supporting surface comprising solid polybutene-1 containing an effective amount of a slightly hygroscopic inert material which is substantially insoluble in water.

2. The method of claim 1 wherein the slightly hygroscopic material is selected from the group consisting of carbon black, attapulgite, nylon fiber, and mixtures thereof.

3. The method of claim 1 wherein the slightly hygroscopic material is present in an amount of from 0.1 percent to 35 percent based on the weight of the polybutene-1.

4. The method of claim 2 wherein the slightly hygroscopic material is present in an amount of from 0.1 percent to 35 percent based on the weight of the polybutene-1.

5. The process of claim 4 wherein the slightly hygroscopic material is carbon black.

6. The process of claim 5 wherein the carbon black is present in an amount of from about 0.5 percent to about 25 percent carbon black based on the weight of polybutene-1.

7. The process of claim 6 wherein the carbon black has a particle size of from about 150 angstroms to about 800 angstroms.

8. A bearing material comprising solid polybutene-1 having a density of from about 0.88 to about 0.92 gram per cubic centimeter and containing from about 0.1% to about 35% by weight based on the weight of the polybutene-1 of a member of the group consisting of attapulgite, nylon fiber, and mixtures thereof.

9. The material of claim 8 wherein said member is present in an amount from about 0.5% to about 25% by weight based on the weight of the polybutene-1.

References Cited

UNITED STATES PATENTS

| | | | |
|---|---|---|---|
| 2,246,092 | 6/1941 | Gilman | 252—12 |
| 3,184,442 | 5/1965 | Nagel | 260—93.7 |
| 3,190,866 | 6/1965 | Nagel | 260—93.7 |

DANIEL E. WYMAN, *Primary Examiner.*

I. VAUGHN, *Assistant Examiner.*

U.S. Cl. X.R.

252—12